TIME DIVISION MULTIPLEXING OF AUDIO AND VIDEO SIGNALS

Filed Aug. 2, 1965

INVENTOR
H. P. KELLY
BY G. E. Hirsch Jr.
ATTORNEY

United States Patent Office 3,423,520

Patented Jan. 21, 1969

3,423,520

TIME DIVISION MULTIPLEXING OF AUDIO AND VIDEO SIGNALS

Hugh P. Kelly, New Providence, N.J., assignor to Bell Telephone Laboratories, Incorporated, New York, N.Y., a corporation of New York Filed Aug. 2, 1965, Ser. No. 476,313

U.S. Cl. 178—5.6 8 Claims

Int. Cl. H04n 7/04

ABSTRACT OF THE DISCLOSURE

Improved recovery of sound pulses transmitted on a time-shared basis with a composite video signal is achieved by placing an auxiliary pulse at a specified reference point in the video signal and by inserting the sound pulse in timed relation to the auxiliary pulse. Delay apparatus for placing the auxiliary timing pulse in the composite signal is necessary only at the transmitter. The receiver need only seek out the auxiliary pulse and use it for timing the recovery of the sound pulse.

Figure 1:
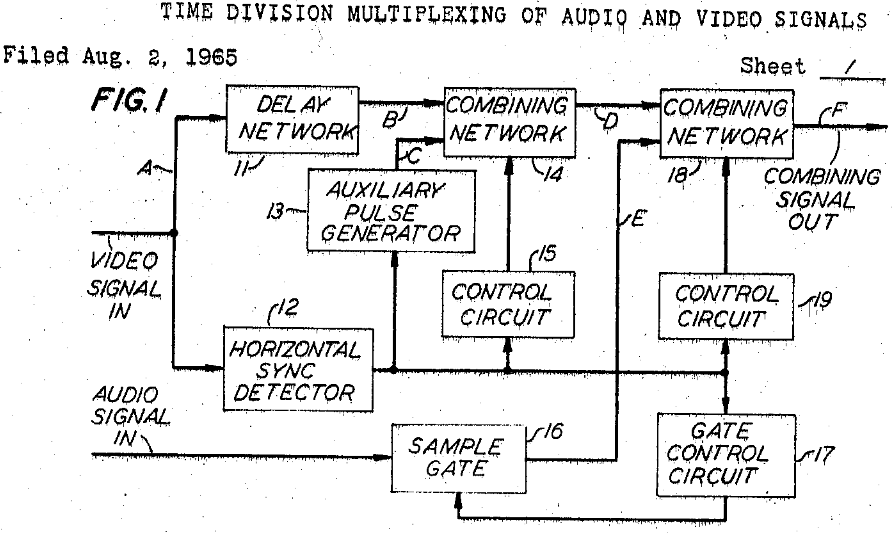

This invention deals with the multiplexing of a sound signal with a vision signal on a time-shared basis. It has for its principal object an improvement in the accuracy and simplicity with which the two signals may be separated from one another.

In transmitting a television broadcast signal it is customary to treat the visual and audible portions as completely independent signals. Thus, separate channels are used, one for video frequency signals and the other for audio frequency signals. It is often desirable, and has been found to be possible, to add the two portions together and handle them as a single, composite signal. One convenient way of doing this is to encode the sound portion of the program material, for example in a pulse code form, and to disperse the pulses in the video signal at portions where they will not interfere with the video signal. It has been found convenient to place sound samples in the interline blanking interval of the video signal, for example, on the front or back porches or in the synchronizing (sync) pulse interval. The sound samples are therefore carried along with the video signal and may be recovered in the receiver.

In order to recover the audio samples, their exact time of occurrence with relation to other portions of the composite signal must be known. If the samples occur during or after a well-defined portion of the signal, for example, a horizontal sync pulse, the placement of the sound sample may be defined in terms of the sync pulse. Since the back porch is often used for color synchronizing information or the like, it is necessary however, in a commercial broadcast system, to restrict the placement of sound samples to the front porch or sync pulse interval. From a practical standpoint, it is not desirable to disrupt the sync pulse itself; the front porch must therefore serve to carry the sound samples.

If the sound sample is placed on the front porch, the timing of it must necessarily stem from some bench mark occurring prior in time to the occurrence of the sample. The transition between the active line scan interval and blanking is generally not defined with sufficient precision to act as a positive marker, and the previous (in time) sync pulse is the only other readily available mark. However, it has been found that the interval between adjacent sync pulses is not always maintained with consistency, especially during vertical blanking intervals, so that timing by way of a counting operation from a sync pulse to the next front porch interval is not reliable and may give rise to a noisy recovery of the sound sample.

Accurate timing can, of course, be accomplished for samples positioned on the front porch, by relating them to the immediately following sync pulse. This requires, however, that a broadband delay network be used for the entire video signal, both at the transmitter in placing the sound samples at a defined time ahead of sync, and at the receiver to gate out the sound pulses. Delay networks capable of delaying video signal information for a full line interval are complex and expensive.

These difficulties are overcome in the present invention by providing an auxiliary timing signal independent of all reference signals commonly carried by a standard broadcast television signal. Sound samples are related in time to the auxiliary timing signal so that recovery at a receiver station may take place accurately and without need for lengthy broadband delay elements.

In accordance with the invention, accurate timing is accomplished by developing auxiliary timing pulses, dispersing them in one of two signals to be combined, and adding samples of the second of the two signals to the first in relation to the auxiliary timing pulse.

In practice, a timing pulse is derived from the leading edge of each sync pulse by detecting sync, passing the entire video signal through a broadband delay network, and by combining the two. The timing pulse then is used to define the beginning of a time interval which precedes the leading edge of the horizontal sync pulse in the delay signal by precisely the delay of the delay network. The timing pulse may therefore be used to time the placement of sound samples on the front porch interval of the delayed video signal. Any form of pulse modulation may be used for the sound or other message samples, e.g., pulse amplitude modulation, pulse duration modulation, pulse position modulation or pulse code modulation.

At the receiver end of the system, separation of the sound from the video is accomplished by gating out the sound samples, recovering the base-band sound from the samples, and restoring the video signal to its original state by detecting both the sound samples and the auxiliary timing pulse.

By thus independently timing the placement of sound samples on the front porch of the video signal, sound samples can be removed, reinserted or replaced by other information samples accurately and without need for extensive delay systems. A variety of secondary information signals, in the form of pulses, may thus be carried by the video signal without interfering with it.

Figure 2:
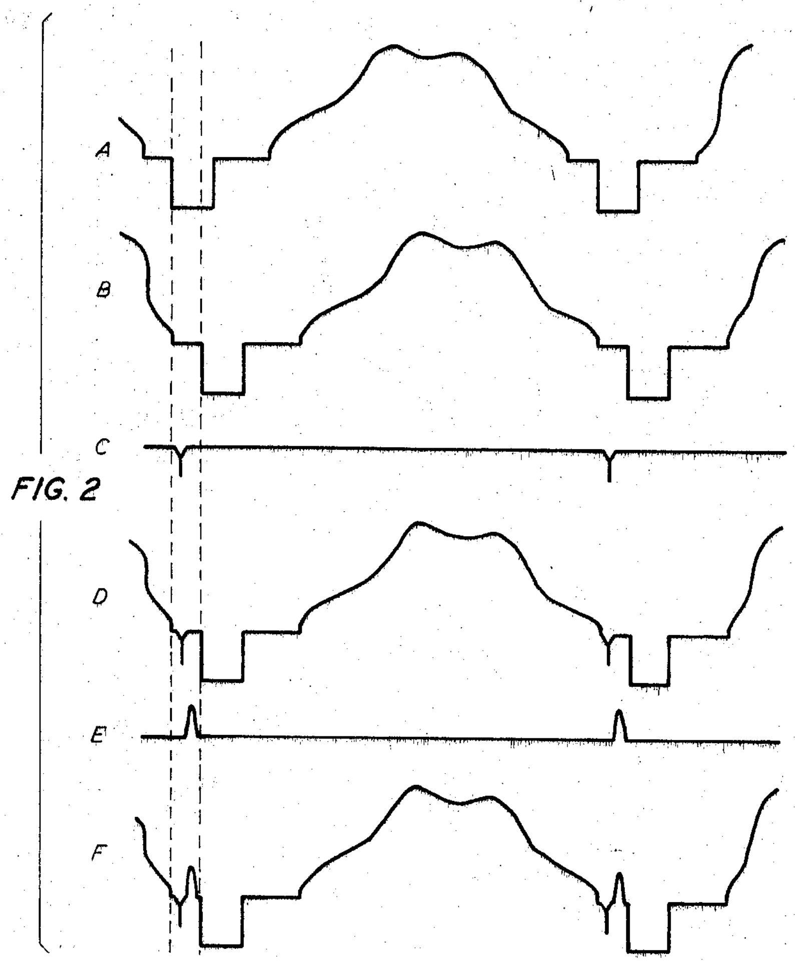
Figure 3:
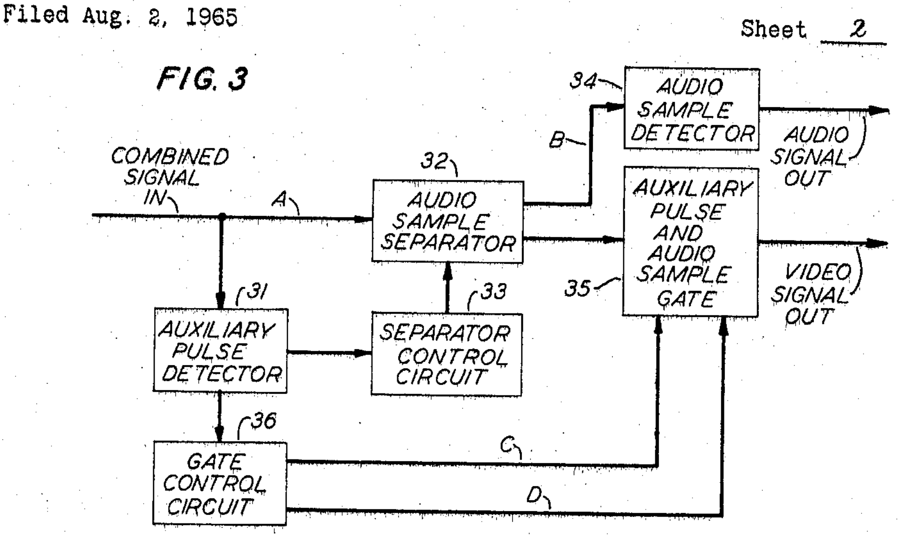
Figure 4:
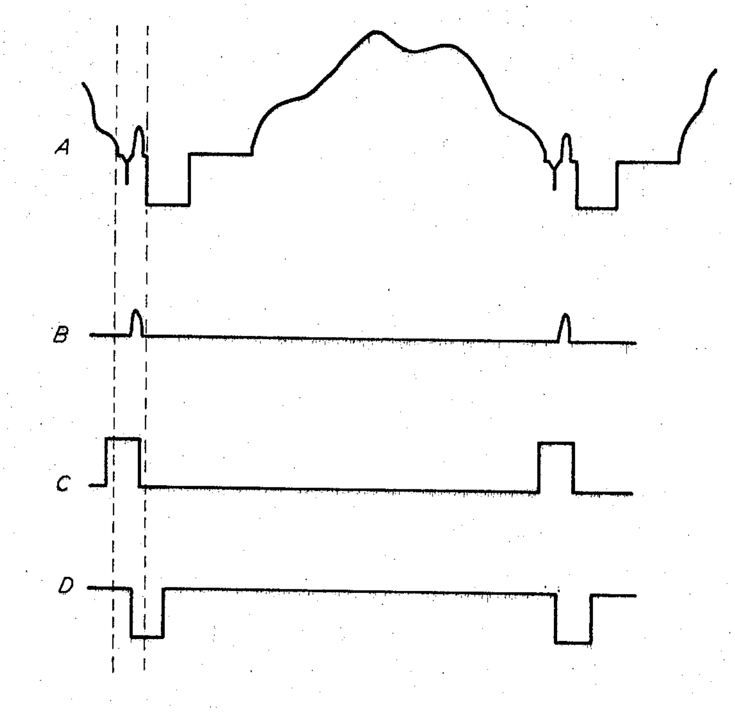

The invention will be more fully apprehended from the following description of a preferred embodiment thereof taken in connection with the appended drawings, in which:

FIG. 1 is a schematic block diagram showing transmitter apparatus embodying the invention, FIG. 2 is a series of waveforms illustrating signals encountered in the operation of the apparatus of FIG. 1, FIG. 3 is a schematic block diagram showing receiver apparatus embodying the invention, and FIG. 4 is a series of waveforms encountered in the operation of the apparatus of FIG. 3.

In the transmitter apparatus of FIG. 1, an input video signal is passed through a broadband delay network 11 which serves to retard the entire signal by an interval D microseconds, where D typically is equal to the minimum front porch interval of a standard NTSC video signal, i.e., 1.26 microseconds. A typical video signal is illustrated in FIG. 2A, and its delayed replica, which appears at the output of network 11, is illustrated in FIG. 2B. At the same time, the video signal is supplied to horizontal sync pulse detector 12 which, in well-known fashion, responds to the leading or trailing edge of the horizontal sync pulse and develops, as its output, a brief pulse which denotes the time of occurrence of the selected edge. The output of detector 12 is thereupon supplied to auxiliary timing pulse generator 13 which develops a brief pulse at a selected time after the selected sync edge. FIG. 2C illustrates a resulting train of auxiliary timing pulses, in this case related to the leading edge of the horizontal sync pulse. Evidently, each auxiliary timing pulse issuing from generator 13 occurs at a point on the front porch of the delayed signal (FIG. 2B), and may be placed arbitrarily close to the beginning of the front porch interval. The auxiliary timing pulse is thereupon added to the delayed video signal in combining network 14 to produce a composite signal of the form illustrated in FIG. 2D. In order to effect a noise-free addition, it may be preferable to enable combiner network 14 only during that part of each horizontal line period during which the timing pulse may be added to the signal. Accordingly, the sync signal from detector 12 is employed to actuate control circuit 15 which generates a timing or gating pulse of sufficient width to control the combining operation of unit 14.

In like manner, sound signals are delivered to sound sampling gate 16 which supplies at its output a sequence of brief samples of the applied sound signals. Preferably, the sampling operation is under control of gate control circuit 17 which is actuated by sync pulse indications issuing from detector 12 and which produces gate pulses of a width just sufficient to effectuate the sampling operation. Since approximately 15,000 sync indications are produced per second, sampling at that rate will insure an audio bandwidth of almost 7,500 cycles. It will be appreciated, however, that sampling gate circuit 17 may employ any ratio of counting or the like in order that sampling may be made to take place at a considerably higher rate. If this is done, it is preferable to bunch the resulting spaced samples together, by means of delay elements or the like, in order that several of them may be placed as one unit on each front porch of the video signal. If this form of coding is employed, a reciprocal delay operation must be used at the receiver. Whatever the mode of encoding, the sound samples developed by sampling gate 16, typically of the form illustrated in FIG. 2E, are supplied to combining network 18 wherein they are added to the video signal (FIG. 2D) to produce a composite output signal of the form illustrated in FIG. 2F.

As before, it may be preferable to enable combiner 18 only during the front porch interval. This may be done by supplying a gating pulse from control circuit 19 under control of an undelayed sync pulse signal from detector 12.

In the example given above, the auxiliary timing pulse is placed in the blacker-than-black region of the video signal, and the subsequent sound samples are placed in the whiter-than-black region. It will be understood, of course, that although certain advantages are gained by this selection of signal placement, other placements may be employed within the purview of the invention.

At the receiver, illustrated in FIG. 3, the composite signal (FIG. 4A) is supplied both to auxiliary pulse detector 31 and to audio sample separator 32. In detector circuit 31, the auxiliary timing pulse is separated from the composite video signal. The detector may comprise, for example, a gating network similar to horizontal sync pulse detector 12 in FIG. 1 but responsive to the first blacker-than-black signal in the last half of the horizontal line interval. The recovered timing pulse is employed to actuate separator control circuit 33, which produces a gating pulse at a prescribed time after the timing pulse. It may consist of a counter, a multivibrator, or the like. The gating pulse is supplied to audio sampling separator 32 in order to enable a path between the composite signal input circuit and audio sample detector 34. Accordingly, sound samples of the form illustrated in FIG. 4B are delivered to detector 34. Detected audio samples correspond to those developed in gate 16 at the transmitter and constitute the sound output. If special encoding was employed for the sound samples at the transmitter, corresponding decoding must, of course, take place at the receiver.

The composite signal from separator 32, which still presumably retains the auxiliary timing pulse and sound samples, is then delivered to pulse and sample gate 35 wherein both the auxiliary timing pulse and sound pulses are deleted from the composite signal.

In order to effectuate the removal of the timing and sound pulses, e.g., by clipping or black level clamping, a pair of gate pulses are developed in control circuit 36. Preferably, the gate pulses are related to the current (in time) blanking interval by means of the auxiliary timing pulse produced by unit 31. Control circuit 36, accordingly, produces a sequence of pulses of the form illustrated in FIG. 4C for wiping out or deleting all signals which occur in the blacker-than-black region of the front porch, i.e., the timing pulse. The pulses of FIG. 4C are timed to begin after the middle of the preceding line scan of the video signal; the exact time of initiation is not critical. By initiating the pulse after the middle of the line scan, there will be no interference by this pulse with equalizing pulses and the like, which are present during the vertical blanking interval of the video signal. The pulses are timed to persist until after the known position of the timing pulse on the front porch, but to terminate before the leading edge of the horizontal sync pulse. Since the timing pulse is related to the leading edge of sync by a known delay (D), control circuit 36 may be implemented to generate the required pulse without employing special techniques.

Control circuit 36 also generates a sequence of pulses of the form illustrated in FIG. 4D for wiping out or deleting all signals which occur in the whiter-than-black region of the front porch, i.e., the sound pulses. Each pulse of the train of pulses of FIG. 4D is initiated at some small interval after the occurrence of the auxiliary pulse to insure that none of the video signal information preceding the front porch is wiped out. Each pulse persists until after the occurrence of all sound samples on the front porch. The termination of each pulse is not critical so long as it is terminated before the end of the horizontal sync interval, i.e., before the occurrence of the back porch with its color burst or other auxiliary signal information.

The two trains of pulses produced by control circuit 36 and supplied to gate apparatus 35 control the removal of both the timing pulse and the audio samples from the composite video signal. Consequently, the video output signal passed by unit 35 is a replica of the original video signal, delayed only by the interval D, i.e., the signal is a replica of the one shown in FIG. 2B.

It is apparent that recovery of the sound samples at the receiver may take place without an extensive and broadband delay system. Moreover, by insuring extremely accurate timing of the separation operation a minimum of contamination of the sound signal, for example from video and noise components of the composite signal, is produced. Accordingly, accurate restoral of both the audio and video portions of the signal is achieved. In a long television transmission circuit, the ability to recover and regenerate sound signals without broadband delay is, of course, an important factor in maintaining transmission standards. By reducing the number of delay networks placed in tandem in such a system, it is possible to acquire higher quality transmission at a reduced cost.

The above-described arrangement is, of course, merely illustrative of the application of the principles of the invention. Numerous other arrangements may be devised by those skilled in the art without departing from the spirit and scope of the invention.

What is claimed is:

1. A system for combining two signals for transmission which comprises, means for inserting timing pulses in the first one of said signals at regular intervals selected in accordance with the message content of said first signal auxiliary to timing pulses contained in said first signal, means for developing a train of pulses representative of the second of said signals, means responsive to said timing pulses for controlling the combination of said pulses with said first signal, and means for transmitting said combined signal over a common transmission medium.

2. In a system for transmitting, on a time-shared basis and over a common medium, the audio and video portions of a television program, means for inserting an auxiliary brief pulse on the front porch of each blanking interval of a video signal in timed relation to a recurring reference point in said interval, and means for inserting audio signal pulses in each blanking interval in timed relation to said auxiliary pulse.

3. In a system for transmitting, on a timed-shared basis and over a common medium, the audio and video portions of a television program, means for inserting an auxiliary brief pulse on the front porch of each blanking interval of a video signal at a preestablished interval before the occurrence of the horizontal synchronizing pulse, and means for inserting audio signal pulses on the front porch at a preestablished interval after the occurrence of said auxiliary pulse.

4. In a television system wherein audio and video signals are transmitted in time alternation in the same transmission channel, means at a transmitter station for inserting a brief pulse in each interline blanking interval of a video signal auxiliary and in timed relation to a video synchronizing signal in said interval, means for inserting audio signal pulses in said interval in timed relation to said brief auxiliary pulse, and at a receiver station, means for recovering said brief auxiliary timing pulse, means responsive to said recovered timing pulse for recovering said audio pulses, and means for deleting said timing pulse from said video signal.

5. Audio-video time division multiplex apparatus which comprises, means at a transmitter station for developing a brief auxiliary pulse timed to occur at a fixed interval before the leading edge of each sychronizing pulse of a video signal, means for inserting said auxiliary pulse on the front porch of each blanking interval of said video signal, means for developing coded pulses at the blanking rate of said video signal representative of an audio signal, means for inserting an audio pulse on the front porch of each blanking interval at a fixed interval after said auxiliary pulse, and, at a receiver station, means for recovering each auxiliary pulse, means responsive to each of said recovered auxiliary pulses for recovering the following audio pulse, and means for deleting said auxiliary pulses and said audio pulses from said video signal.

6. A system for transmitting audio and video signals for transmission via a common communications channel which comprises, in combination, means at a transmitter station for delaying an applied composite video signal for an interval substantially equivalent to the interval occupied by the front porch of the horizontal blanking interval of said video signal, means for detecting the leading edge of the horizontal synchronizing pulse of said video signal, means responsive to said detected synchronizing pulse for generating a brief auxiliary pulse, means for adding said brief pulse to said delayed video signal, means for sampling an applied audio signal at the synchronizing signal rate of said video signal, and means responsive to said auxiliary pulse for adding a sample of said audio signal to the front porch of said delayed video signal.

7. A system for receiving audio and video signals transmitted via a common communications channel wherein audio samples and an auxiliary pulse identifying said audio sample occur on the front porch of the horizontal blanking interval of a composite video signal which comprises, in combination, means for detecting said auxiliary pulse, means responsive to said detected auxiliary pulse for separating said audio sample from said composite video signal, means responsive to said timing pulse for developing first and second gating pulses, means for employing said first gating pulse to delete said auxiliary pulse from said composite video signal, and means for employing said second gating pulse for deleting said audio sample from said composite video signal.

8. Audio and video time division multiplex apparatus for television program signals which comprise, in combination, means responsive to the horizontal synchronizing pulses of a video signal for timing the addition of an auxiliary pulse to the blanking interval of said video signal, means responsive to said auxiliary pulse for timing the addition of audio samples to the blanking interval of said video signal, means for transmitting said video signal together with said auxiliary pulse and said audio samples to a receiver station, and at said receiver station, means for detecting said auxiliary pulse, means responsive to said detected auxiliary pulse for recovering said audio samples, and means responsive to said detected auxiliary pulse for effecting the deletion from said video signal both of said auxiliary timing pulse and said audio samples.

References Cited

UNITED STATES PATENTS 2,539,440 1/1951 Labin et al. ---------- 178—5.2

ROBERT L. GRIFFIN, *Primary Examiner.*

R. L. RICHARDSON, *Assistant Examiner.*

U.S. Cl. X.R.

325—38